United States Patent
Vannest

[15] 3,685,114
[45] Aug. 22, 1972

[54] METHOD FOR MAKING A ROLLER BEARING RETAINER

[72] Inventor: James L. Vannest, New Britain, Conn.

[73] Assignee: Textron Inc., Providence, R.I.

[22] Filed: June 29, 1970

[21] Appl. No.: 60,185

Related U.S. Application Data

[62] Division of Ser. No. 798,618, Feb. 12, 1969, Pat. No. 3,598,459.

[52] U.S. Cl. .............................. 29/148.4 C, 29/558
[51] Int. Cl. ....................... B21d 53/12, B23p 13/04
[58] Field of Search ............ 29/148.4 C, 558, 148.4, DIG. 26; 308/217

[56] References Cited

UNITED STATES PATENTS

| | | | |
|---|---|---|---|
| 2,765,518 | 10/1956 | Lovell et al. | 29/558 X |
| 3,486,212 | 12/1969 | Vannest | 29/148.4 C |

*Primary Examiner*—Thomas H. Eager
*Attorney*—Hopgood and Calimafde

[57] ABSTRACT

The invention contemplates making a bearing-roller retainer ring from a solid annular body having a pair of radially projecting ribs that are axially spaced apart and are located inwardly from the axial ends of the body. Like spaced rectangular openings are formed radially through the body and the ribs, with a circumferential width less than the roller diameter. The width is then enlarged through the opening, from the radial side opposed to the ribs and to a radial extent short of the projecting radial limits of the ribs and to a width extent sufficient to accommodate the roller diameter. The pockets are sufficiently close to permit transient non-permanent resilient deflection of the ribs as rollers are inserted in the course of assembly to a race ring.

The retainer ring is preferably formed from a ribbed annulus by making radial openings through the annulus and ribs and by enlarging the width of the openings to a depth less than the projecting limits of the ribs. The ribs are thus formed into lugs with lips projecting from their end portions.

6 Claims, 7 Drawing Figures

PATENTED AUG 22 1972 3,685,114

INVENTOR
JAMES L. VANNEST
BY
Sandoe, Hopgood & Calimafde
ATTORNEYS

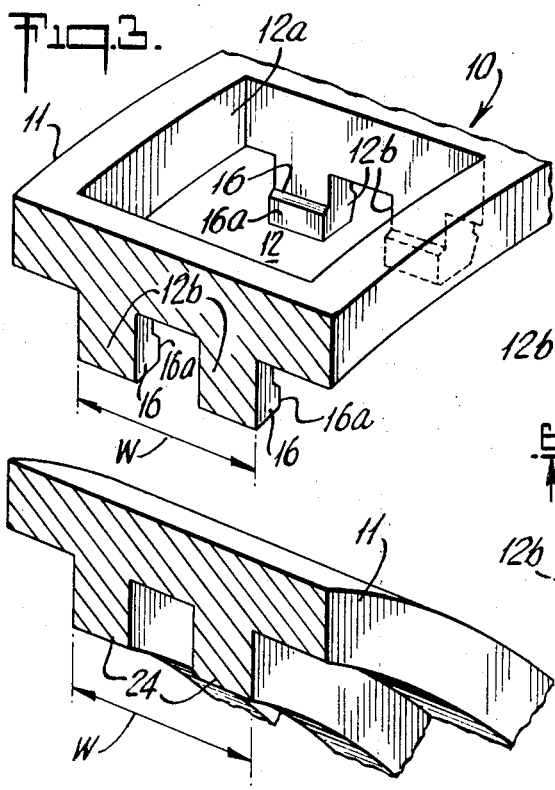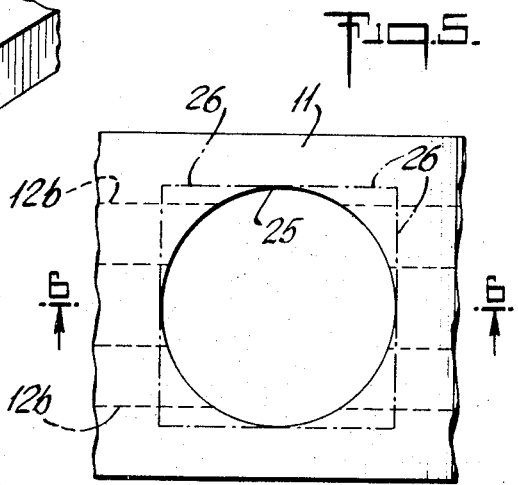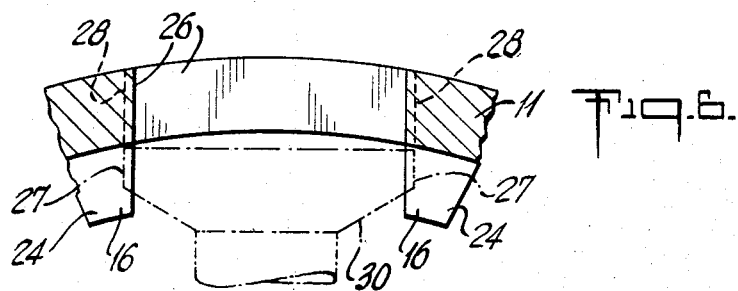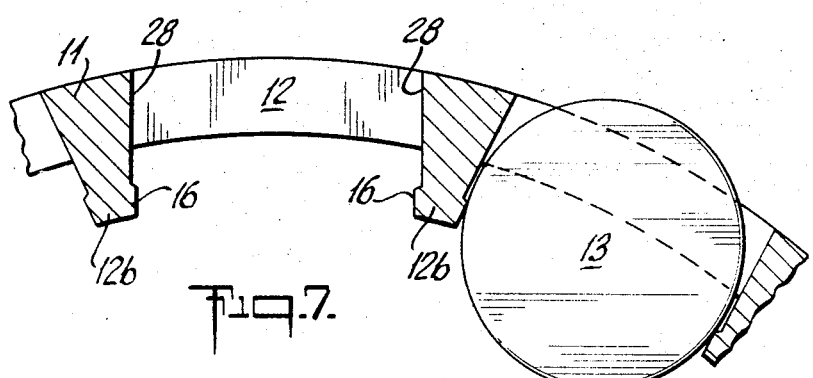

METHOD FOR MAKING A ROLLER BEARING RETAINER

This application is a division of my copending application Ser. No. 798,618, filed Feb. 12, 1969, now U.S. Pat. No. 3,598,459.

The present invention relates to roller bearings and is an improved retainer ring for the rollers in such bearings and a simple effective method of making the retainer ring.

It is known to provide retainer rings for roller bearings wherein the rollers are received in pockets in a ring and bendable tabs adjacent the pockets are bent over to retain the rollers therein. To achieve smooth-running bearings, particularly in high-speed bearings, it is, however, important for the retainer ring and rollers to be well balanced relative to the axis of the bearing, but the deformation of the bendable tabs for retaining the rollers in the pockets is usually uneven around the circumference of the ring and throws the ring out of balance. This reduces the efficiency of the unit and cuts down the service life of the bearing and of machine elements associated therewith. Moreover, the necessity for bending tabs for each pocket increases the difficulty and expense of assembling the bearing; and bent tabs are prone to break off, producing harmful debris in the bearing.

My copending application Ser. No. 778,684, filed Nov. 25, 1968, for ROLLER BEARING RETAINER (now U.S. Pat. No. 3,628,839) discloses a retaining ring, and an economical method of making it, wherein a tab or lug extends from the ring at the central portion of each of two opposite sides of each pocket. The lugs are resilient and have lips projecting into the pockets to restrict the size of the openings into the pockets at one side of the ring to less than the diameter of the bearing rollers to be received in the pockets. The lugs and lips are thus adapted to be resiliently forced apart for inserting rollers in the pockets and then to spring back to a position in which they prevent the rollers from passing out between the lips again. Thus the lugs and lips are not permanently deformed during assembly and are in good balance in the bearing. In accordance with the disclosure of this copending application, each pocket has only one lug, with a lip thereon, at the central portion of each of its two opposite sides for supporting and retaining a roller.

In accordance with the present invention there is a pair of lugs, with lips thereon, spaced apart on each of two opposite sides of each pocket. This provides more widely spaced lateral support for the bearings in each pocket than the single lug of the aforementioned copending application, and is particularly adapted for wider roller bearings. Also, in accordance with the preferred method of making the retainer ring of this invention, a unitary solid annular body is characterized by a pair of spaced radially projecting annular ribs from which the lugs and lips are formed, the spacing of the ribs determining the lateral spacing of the lugs on the sides of each pocket.

In accordance with the preferred method of making the pockets a bore, which has a diameter slightly less than the diameter of a bearing to be received in the pocket, is made radially through the body and through the adjacent ribs. The exposed faces of the ribs at opposite sides of the bore are undercut to leave lips projecting into the bore at the outer end portions of said rib faces. Then the remainder of the bore is enlarged and made rectangular for a bearing to be rotatively received therein, the lips serving to prevent the bearing from falling out one end of the pocket thus formed.

The lugs at each pocket are formed to be resiliently deflectable so as to be adapted to being pushed momentarily aside to admit the bearing rollers into the respective pockets and then return to their normal position in which they preserve the predetermined balance of the ring while serving to retain the rollers in the pockets. The lips prevent the rollers from falling out of one open end of the respective pockets; the rollers are prevented from passing out through the other ends of the pockets by a race ring placed concentrically adjacent the retainer ring. With this structure the retainer ring, the bearing rollers and one race can be assembled into a self-supporting unit-handling pre-assembly. To assemble such a pre-assembly the ring is positioned concentrically within an appropriate race which has an annular groove into which protruding sides of the rollers will be received, and held against lateral displacement thereby, when the rollers are in the pockets. The rollers are then inserted into the respective pockets by springing the appropriate lugs apart to admit them as explained above. Thus the rollers are held in the pockets and the pre-assembly is held together by the lips on the lugs at one side of the ring and by the race encircling the other side. In use this pre-assembly is mounted on a shaft or within a bore which provides the other race for a complete bearing unit.

A particular object of the present invention is to provide a method for making a bearing-roller retainer ring in which the means for retaining the rollers therein do not change the balance of the bearing, as is the case when such means comprise tabs which must be bent over into position to retain the rollers in the pockets as in known types of retainer rings.

Another object is to provide a method for making a retainer ring in which the rollers are received in pockets and are prevented from falling through the pockets in one direction by a pair of inwardly directed, spaced apart lips at each of two opposite sides of each pocket so that each bearing is supported at laterally spaced apart points across the ring. The rollers will thus be well supported and will not cock out of axial alignment in the bearing or in the pre-assembly. This is important since a cocked bearing roller is apt to damage the races, for example, by the edge of the cocked bearing scraping across a race surface during assembly or disassembly of the bearing. Moreover, a cocked roller causes the bearing to run roughly, with resultant harmful vibrations in associated machine elements; and reduces the service life of the bearing.

Still another object is to provide a simple and effective method of making a retainer ring having the above-described structure.

These and other objects, advantages and features of this invention will be apparent from the following detailed description of preferred embodiments and of a preferred method of forming the structure, illustrated by the accompanying drawings, in which:

FIG. 3 is a fragmentary perspective view of a roller receiving pocket in a retainer ring of FIG. 1;

FIG. 4 is a fragmentary perspective view of a solid annular body from which a retaining ring is adapted to be made in accordance with the method of the invention;

FIG. 5 is a fragmentary plan view of the periphery of the annular body of FIG. 4 illustrating a first radial bore made through the body as the first step in forming a roller receiving pocket by a method of this invention;

FIG. 6 is a section in the plane 6—6 of FIG. 5 indicating additional steps in the formation of the pocket; and FIG. 7 is a view similar to the view of FIG. 6 but showing a pair of adjacent pockets in finished condition with a bearing roller positioned in one of them.

Figure 1:
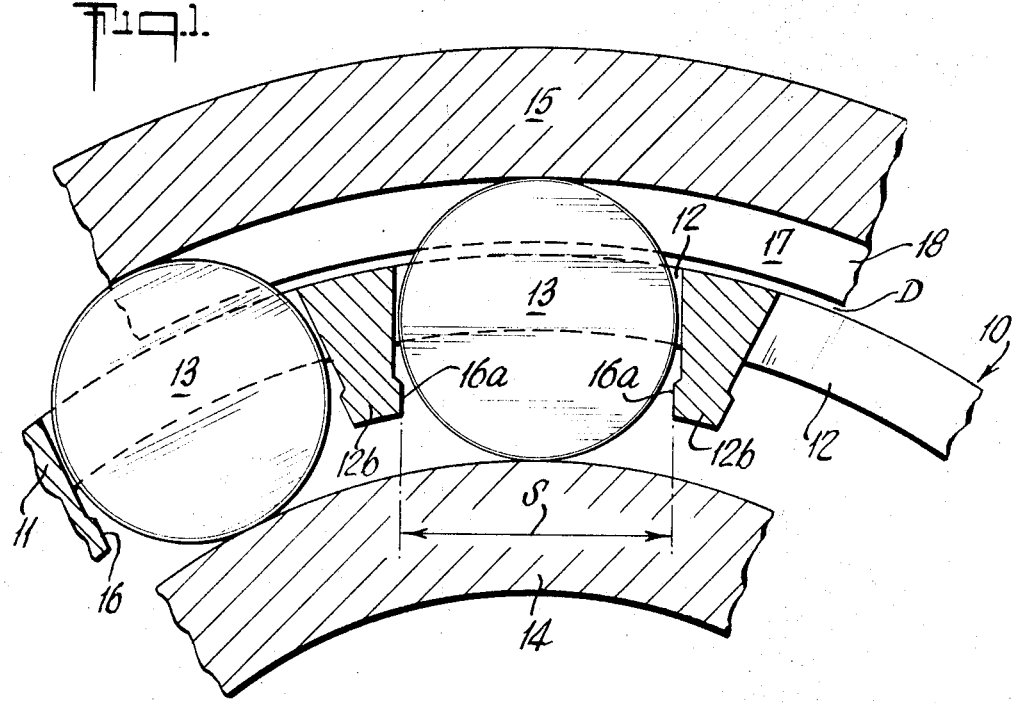
FIG. 1 is an enlarged fragmentary sectional view of a roller bearing assembly incorporating a retainer ring of this invention, the section being taken in a radial plane, through the axis of the assembly.

Referring to FIGS. 1 and 3, a retainer ring 10 in accordance with this invention is a cylindrical annulus 11 having pockets 12 radially therethrough at angularly spaced intervals for receiving bearing rollers 13 and retaining them in spaced planetary arrangement between an inner race or ring 14 and an outer race or ring 15 of the complete roller-bearing assembly illustrated in FIG. 1.

The pockets 12 are rectangular as viewed in the radial direction, and are dimensioned to receive and retain the rollers 13 in coaxial alignment with sufficient clearance for the rollers to rotate in the pockets. Each pocket is defined by a rectangular opening 12a (FIG. 3) through the body portion of the annulus 11 with a pair of lugs 12b projecting radially from the body at each of the two sides of the opening 12a which are opposite each other in the circumferential direction of the annulus. Each lug 12b has a lip 16 thereon projecting into the pocket far enough so that the space S between the inward edges 16a of the lips at opposite sides of each pocket is narrower than the diameter of the rollers 13 intended to be received in the pockets. Thus, the lips 16 prevent the rollers 13 from falling out of the end of the pockets in one radial direction—inward in FIGS. 1 and 3. The rollers are prevented from coming out the other ends of the pockets by the adjacent race member, the outer one in FIG. 1—which will normally have an annular groove or raceway 17 defined by radial flanges 18 projecting from its side edges for retaining the rollers in the axial direction. Thus, a retainer ring 10 having rollers 13 in its pockets 12 and mounted concentrically within, or around the outside of, an appropriate one of the outer or inner races 15 or 19, provides a self-supporting or unit-handling assembly, adapted for subsequent mounting on a shaft or within a bore—which forms the other race.

As best seen in FIG. 3, the pairs of lugs 12b, and hence their lips 16, are spaced apart at the respective sides of the openings 12a to provide support surfaces spaced apart along opposite sides of the opening 12a. These spaced supports thus hold the rollers 13—particularly elongated rollers in relative wide bearing units—in axial alignment and prevent their cocking out of position. Thus, a preassembly slides smoothly onto a shaft or into a bore, depending on the particular structure, and the rollers 13 being supported in the aforesaid manner will not cock or tilt out of position and scrape or gouge the shaft or bore surface, which is a problem with previous constructions. Consequently, this axial support of the rollers 13 avoids damage to the parts during assembly and disassembly of the bearing unit—during initial assembly and subsequent takedowns for cleaning or repair—and increases the service life of the bearing as well as providing a smoother running bearing.

In the retainer ring shown in FIG. 1, adjacent pockets 12 are spaced closely together around the annulus, and each adjacent pair shares a pair of lugs 12b, the opposite sides of the lugs in the circumferential direction facing into, and forming support surfaces of, the respective pockets and there being a lip 16 projecting from each of said sides.

In a preferred form the lugs 12b, or at least their outward end portions from which the lips 16 project, are laterally flexible as a means to simplify assembling the rollers into a pre-assembly. In assembling the bearing illustrated in FIG. 1, the retainer ring 10 is placed concentrically within the outer race ring 15. Then bearing rollers 13 are slipped into respective pockets 12 through the lips 16 which are either sprung apart to admit a roller or are moved apart by pushing the rollers through them. At the opposite side of the ring 10 from the lips 16 the sides of the roller 13 project beyond the periphery of the ring into the groove 17 of the outer race 15 which is thereby held in coaxial relation with the ring 10 and rollers 13. A small radial clearance D between outer-ring flanges and the adjacent outer surfaces of retainer 10 enables the retainer to pilot on the race ring 15 to which it is pre-assembled. These elements are thus locked into a unit-handling preassembly that is adapted to be subsequently mounted on a shaft or tube which becomes the inner race 14 of the completed bearing unit.

Figure 2:
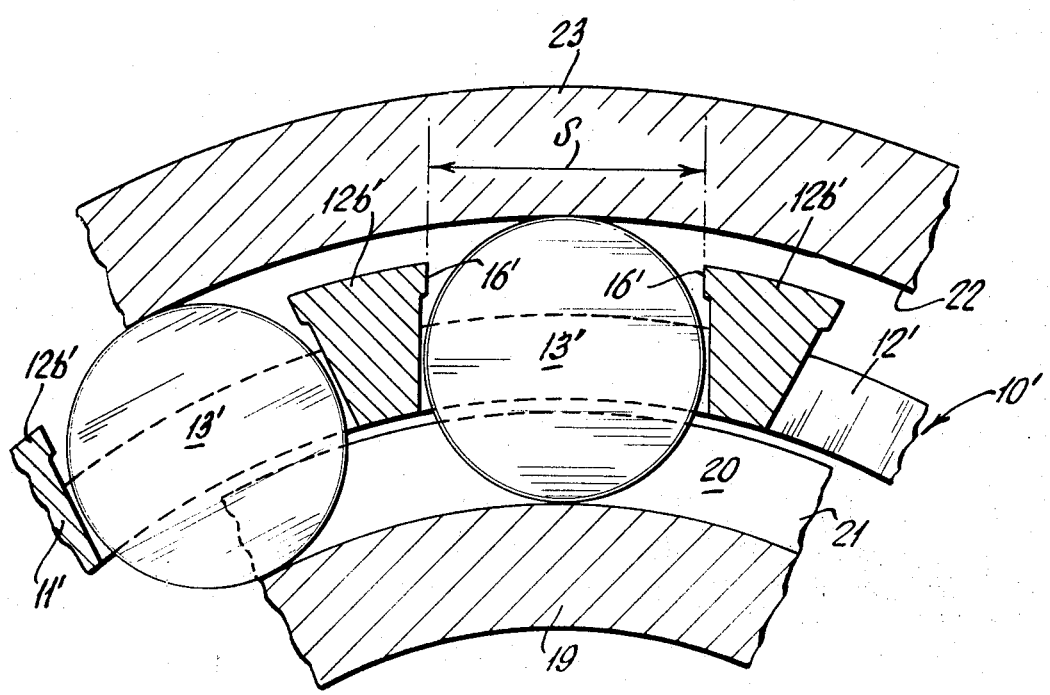
FIG. 2 is a view similar to the view of FIG. 1, but showing an alternative construction.

FIG. 2 illustrates an alternative construction in which a retaining ring 10' is the reverse of the retaining ring 10 of FIG. 1. That is, it has lugs 12b' projecting out from the outside diameter of an annulus 11' with lips 16' at the outer end portions of the lugs 12b' which define the radially outer portions of the roller-receiving pockets 12'; opposite pairs of lips 16' are shown with the spacing S. A pre-assembly including this retaining ring 10' is held together by an inner race ring 19 which has a peripheral groove 20, defined by outwardly projecting edge flanges 21, between which the axial ends of rollers 13' in the pockets 12') are received, and closely spaced adjacent cylindrical surfaces on ring 10 and flanges 21 enable the retainer to pilot on the inner ring 19. This pre-assembly is then subsequently mounted within a bore or outer race 22 which may be provided by an outer race ring 23. Aside from this reversal of structure, the construction, function and advantages of the structural elements of the FIG. 2 embodiment are the same as those described with reference to the corresponding elements in the FIG. 1 embodiment.

Referring now to FIGS. 4-7, a retaining ring 10 (FIG. 1) is preferably formed from a solid annulus 10 having a pair of annular ribs 24 projecting from its interior surface. The lugs 12b and lips 16 are formed from these ribs 24, which should thus be spaced apart the amount desired for the lateral spacing of the lugs 12b at the respective sides of each pocket 12 to be formed in the annulus. Such lateral spacing provides stabilizing support for roller alignment between limits denoted by the dimension W which may be as long as rollers 13 but which is preferably in the order of 80 percent of the roller length.

In accordance with a preferred method of forming a retainer ring 10 from the ribbed annulus 11, pocket 12 is made by drilling a bore 25 radially all the way through the annulus 11. The diameter of the bore 25 has a diameter which may approximate the diameter of a roller 13 which is to be received in the completed pocket 12; it also is preferably made large enough to intersect both ribs 24 in its path. The bore 25 is then broached with a suitable broaching tool to enlarge it to an opening 26, indicated in dash lines in FIG. 5, which is rectangular in the radial direction; opening 26 has a breadth laterally across the annulus sufficient to accommodate the length of a roller 13 and a width less than the diameter of a roller 13 in the circumferential direction of the annulus. Referring to FIG. 6, after formation of the rectangular opening 26, portions 27 of the faces of the ribs exposed at opposite sides of the opening are undercut between the body of the annulus 11 and the projecting limits of the ribs to leave lips 16 projecting into the opening 26. This undercutting is done with a suitable tool, such as a dovetail broach (suggested by heavy phantom outline 30) which is traversed across the width of the opening to undercut both sides at once, and is made deep enough so that the width across the opening 25 at the undercut portions 26 is at least approximately equal to the diameter of a roller 13. Then the width of the opening 25 in the circumferential direction is enlarged from the side of the annulus 11 radially opposite the ribs 24, by a second stage of broaching or other suitable means, to a width to accommodate the diameter of a roller 13 with clearance to rotate therein and to a depth sufficient to enlarge the width of the opening down to the lips 16. The enlarged pocket width is indicated by dash lines 28 in FIG. 6. This enlarging is suitably accomplished by widening the portion of the opening 26 through the body of the annulus 11 since the portion below the body is enlarged by the previously described undercutting. In practice, it does not particularly matter whether the undercutting of the ribs is performed before or after the enlarging of the opening 26.

It will be appreciated that other suitable means, such as electrochemical machining, may be used instead of boring, milling and broaching for making and shaping the openings through the annulus 11 and ribs 24 to form each pocket 12.

As indicated in FIG. 7, successive pockets 12 may be made closely adjacent each other to accommodate the maximum number of rollers 13 and can be made sufficiently close for the portions of the ribs 24 which form the lugs 12b of adjacent pockets 12 to be thin enough to have the requisite resiliency for admitting rollers 13 into the pockets by being able to push the lugs 12b aside momentarily, without involving permanent deformation of the lugs or any other parts.

The retaining ring 10' having pockets 12' shown in FIG. 2 is suitably made in substantially the same manner as just described with reference to the ring 10 and pockets 12 of FIG. 1. However, for the ring 10' of the annular ribs, from which the lugs 12b' and lips 16' are formed, project outward from the outside circumference of the solid annulus 11' and the final enlarging step is performed by enlarging the openings from inside the annulus outward to the lips 16' on the outer projection limits of the lugs 12b'.

It will be appreciated that the above description is of illustrative embodiments and that some modifications may be made in the structure, arrangement and methods of manufacture described without departing from the scope of the invention defined by the following claims.

What is claimed is:

1. A method of making a bearing-roller retainer ring from a solid annular body having a pair of radially projecting annular ribs that are axially spaced apart and are located inwardly from the axial ends of the body, said method comprising forming bearing-roller receiving pockets by making a plurality of equally angularly spaced like rectangular openings radially through the body and extending all the way through the adjacent portions of the ribs, the width of each such opening in the circumferential direction of the body being less than the diameter of a bearing roller intended to be received in the pocket, enlarging said width through received in the pocket, enlarging said width through the opening from the radial side of the body opposite the ribs to a width sufficient for said bearing roller to be received therein with clearance to rotate and to a radial extent less than the projecting limit of the ribs thereby to form lips at the outer edges of the ribs projecting into and limiting the size of one end of the opening; whereby each opening provides a pocket for a roller, and the lips prevent the roller from passing completely out through one end of the pocket; said enlarged pockets being sufficiently close, in the context of the mechanical properties of the material of said ring, that said lips are resiliently but non-permanently displaceably suspended with respect to the remaining ring body, to permit radial snap-insertion of a roller into each pocket past the lips associated therewith.

2. The method of claim 1 in which said openings and the said enlarging thereof are electrochemically machined.

3. The method of claim 1 in which, before said width is enlarged, the portions of said ribs between the body and the projecting limit of the ribs adjacent to the openings previously made through the ribs are broached to form a circumferential opening through said portions of the ribs at least equal to the diameter of said bearing roller in the circumferential direction of the body and ribs.

4. The method of claim 1 in which the making of the rectangular opening is made by drilling a cylindrical bore radially through the body and extending all the way through the adjacent portions of the ribs, the diameter of the bore being less than the diameter of a bearing roller intended to be received in the pocket, broaching the bore to a rectangular opening radially through the body and adjacent ribs to a width less than the diameter of said roller in the circumferential direction of the body and to a breadth in the axial direction of the body sufficient to accommodate the axial length of the roller a and thereafter enlarging said width through the opening from the side of the body opposite the ribs to a width sufficient for said roller to be received therein with clearance to rotate and to a depth less than the projecting limit of the ribs thereby to form said lips at the outer edges of the ribs.

5. The method of claim 1, in which said ribs project radially inwardly, and in which the width-enlarging step is performed radially inwardly.

6. The method of claim 1, in which said ribs project radially outwardly, and in which the width-enlarging step is performed radially outwardly.

* * * * *